(12) United States Patent
Martin

(10) Patent No.: US 9,441,092 B2
(45) Date of Patent: Sep. 13, 2016

(54) HYDROGEN SULFIDE SCAVENGER

(71) Applicant: Innophos, Inc., Cranbury, NJ (US)

(72) Inventor: Jean Valery Martin, Princeton, NJ (US)

( * ) Notice: Subject to any disclaimer, the term of this patent is extended or adjusted under 35 U.S.C. 154(b) by 248 days.

(21) Appl. No.: 14/170,224

(22) Filed: Jan. 31, 2014

(65) Prior Publication Data
US 2015/0218342 A1    Aug. 6, 2015

(51) Int. Cl.
C08K 3/00      (2006.01)
C08K 5/00      (2006.01)
C08K 5/17      (2006.01)
C08L 95/00     (2006.01)

(52) U.S. Cl.
CPC ............. C08K 5/175 (2013.01); C08K 5/0008 (2013.01); C08K 5/0091 (2013.01); C08L 95/00 (2013.01)

(58) Field of Classification Search
None
See application file for complete search history.

(56) References Cited

U.S. PATENT DOCUMENTS

| 4,036,942 A * | 7/1977 | Sibeud ................ B01D 53/48 208/207 |
| 2005/0145137 A1* | 7/2005 | Buras .................... C08L 95/00 106/284.3 |

* cited by examiner

*Primary Examiner* — Colin W Slifka

(57) ABSTRACT

The present disclosure is related to a family of metals chelates for use as a hydrogen sulfide scavenger in asphalt, and the preparation thereof. The metal chelates, in particular amino acid metal chelates, are particularly efficient at reducing the hydrogen sulfide emissions of asphalt.

2 Claims, No Drawings

HYDROGEN SULFIDE SCAVENGER

FIELD OF THE INVENTION

The present disclosure relates to a hydrogen sulfide scavenger for use as an additive in asphalt.

BACKGROUND OF THE INVENTION

Asphalt is commonly used in the construction and paving of roads. Asphalt is a mixture of aggregate material, such as sand, gravel, and crushed stone, with hot bitumen. The bitumen coats the aggregate material to give the asphalt, which may be spread as a uniform layer upon a road bed and compacted and smoothed with heavy rolling equipment.

Asphalt invariably contains sulfur. The amount of sulfur will depend on the origin of the crude oil, as well as the processes used to refine the crude oil, into asphalt. The sulfur may exist in different forms. For example, sulfur may be in the form of hydrogen sulfide. Hydrogen sulfide, or dihydrogen sulfide, is a chemical compound with the formula $H_2S$. It is a colorless, poisonous, flammable gas with the characteristic foul odor.

Hydrogen sulfide may be released form asphalt, in particular when the asphalt is heated to a certain temperature. For example, hydrogen sulfide results from the dehydrogenation reactions that occur between bitumen and sulfur at the hot mixing temperatures, e.g. temperatures greater than 140° C. Hydrogen sulfide emissions are regulated. Therefore, there exists a need to reduce the amount of hydrogen sulfide in asphalt. Accordingly, the present disclosure provides for a reduced or low release of hydrogen sulfide during the preparation of asphalt, as well as in the final asphalt material.

SUMMARY OF THE INVENTION

The present disclosure is related to a family of metals chelates for use as a hydrogen sulfide scavenger in asphalt, and the preparation thereof. The metal chelates, in particular amino acid metal chelates, are particularly efficient at reducing the hydrogen sulfide emissions of asphalt.

The present disclosure is directed to a composition comprising asphalt and an amino acid metal chelate. In some embodiments, the amino acid metal chelate is selected from the group consisting of copper bis-glycinate, zinc bis-glycinate and mixtures thereof.

The present disclosure is also directed to a method of reducing hydrogen sulfide emission from asphalt, or the preparation thereof, comprising the step of combining an amino acid metal chelate to asphalt, or an asphalt mix. In some embodiments, the amino acid metal chelate is selected from the group consisting of copper bis-glycinate, zinc bis-glycinate and mixtures thereof.

The amino acid metal chelate may also be selected form the following: Boron Amino Acid Chelate; Boron Aspartate; Boron Citrate; Boron Glycinate; Calcium Alphaketoglutarate; Calcium Amino Acid Chelate; Calcium Arginate; Calcium Ascorbate; Calcium Aspartate; Calcium Caprylate; Calcium Carbonate; Calcium Citrate Malate; Calcium Glycinate; Calcium D-Glucarate; Calcium Krebs Cycle; Calcium Lactate; Calcium Malate; Calcium Orotate; Calcium Succinate; Chromium Amino Acid Chelate; Chromium Arginate; Chromium Chloride; Chromium Dinicotinate/Glycinate; Chromium Picolinate; Chromium Nicotinate; Chromium Trit; Chromium Yeast; Chromium Nicotinate/Glycinate; Copper Amino Acid Chelate; Copper Aspartate; Copper Carbonate; Copper Citrate; Copper Gluconate; Copper Glycinate; Copper Sulfate; Copper Yeast; Iron Amino Acid Chelate; Iron Aspartate; Iron Bis-Glycinate HCl Soluble; Iron Citrate; Iron Fumarate; Iron Gluconate; Iron Glycinate; Iron Sulfate; Iron Yeast; Lithium Aspartate; Lithium Orotate; Magnesium Alphaketoglutarate; Magnesium Amino Acid Chelate; Magnesium Ascorbate; Magnesium Aspartate; Magnesium Citrate; Magnesium Gluconate; Magnesium Glycinate; Magnesium Malate; Magnesium Orotate; Magnesium Oxide; Magnesium Succinate; Magnesium Taurinate; Magnesium Yeast; Manganese Amino Acid Chelate; Manganese Aspartate; Manganese Carbonate; Manganese Citrate; Manganese Gluconate; Mananese Glycinate; Manganese Sulfate; Manganese Yeast; Molybdenum Amino Acid Chelate; Molybdenum Trit; Molybdenum Yeast; Sodium Molybdate; Phosphorus Amino Acid Chelate; Dicalcium Phosphate; Potassium Amino Acid Chelate; Potassium Ascorbate; Potassium Aspartate; Potassium Citrate; Potassium Chloride; Potassium D-Glucarate; Potassium Gluconate; Potassium Glycerophosphate; Potassium Iodide Trit; Potassium Succinate; Selenium Amino Acid Chelate; Selenium Aspartate; L-Selenomethionine; Selenium Yeast; Sodium Selenate; Sodium Selenite; Strontium Aspartate; Strontium Citrate; Strontium Glycinate; Vanadium Amino Acid Chelate; Vanadium Citrate; Bis-Maltolato Oxo Vanadium; Vanadyl Sulfate; Sodium Metavanadate; Zinc Acetate; Zinc Arginate; Zinc Amino Acid Chelate; Zinc Ascorbate; Zinc Aspartate; Zinc Gluconate; Zinc Glycinate; Zinc Methionate; Zinc Oxide; Zinc Picolinate; Zinc Sulfate; and Zinc Yeast

EXAMPLES

Example 1

Hydrogen sulfide emissions were measured from asphalt samples containing an amino acid metal chelate versus a control containing no amino acid metal chelate. Three asphalt samples were prepared and their hydrogen sulfide emissions measured after 1 hour in storage. To two samples, 0.5% amino acid metal chelate additive was added, CuGlyc (copper bis-glycinate) and ZnGlyc (zinc bis-glycinate) respectively. The hydrogen sulfide emissions were measured again after 5 minutes and 1 hour. Table 1 lists the results. The addition of the amino acid metal chelate showed significant reduction in hydrogen sulfide emissions.

TABLE 1

| | Hydrogen Sulfide Emission | | | |
|---|---|---|---|---|
| % Additive | | Temp | $H_2S$ (ppm) Storage at 160, one hour | $H_2S$ (ppm) 5 minutes after addition of scavenger | $H_2S$ (ppm) 1 hour after adding scavenger material |
| 0 | Control | 180° C. | 16 | | 10 |
| 0.5 | CuGlyc | 180° C. | 12 | 4 | 1 |
| 0.5 | ZnGlyc | 180° C. | 10 | 5 | 1 |

Example 2

Additional amino acid metal chelates that may be used in asphalt, or the preparation thereof, are listed in Table 2.

TABLE 2

| Amino Acid Metal Chelates | |
|---|---|
| Metal | Chelating agent |
| Chromium | Amino Acid |
| | Arginate Chloride |
| | Dinicotinate/Glycinate |
| | Picolinate |
| | Nicotinate |
| | TritChromium Yeast |
| Copper | Amino Acid |
| | Aspartate |
| | Carbonate |
| | Citrate |
| | Gluconate |
| | Sulfate |
| | Yeast |
| Iron | Amino Acid |
| | Aspartate |
| | Bis-Glycinate |
| | Citrate |
| | Fumarate |
| | Gluconate |
| | Sulfate |
| | Yeast |
| Manganese | Amino Acid |
| | Aspartate |
| | Carbonate |
| | Citrate |
| | Gluconate |
| | Sulfate |
| | Yeast |
| Molybdenum | Amino Acid |
| | TritMolybdenum |
| | Yeast |
| | Sodium Molybdate |
| Selenium | Amino Acid |
| | Aspartate |
| | L-Selenomethionine |
| | Yeast |
| | Sodium Selenate |
| | Sodium Selenite |

TABLE 2-continued

| Amino Acid Metal Chelates | |
|---|---|
| Metal | Chelating agent |
| Strontium | Aspartate |
| | Citrate |
| | Glycinate |
| Vanadium | Amino Acid |
| | Citrate |
| | Bis-Maltolato Oxo Vanadium |
| | Vanadyl Sulfate |
| | Sodium Metavanadate |
| Zinc | Acetate |
| | Arginate |
| | Amino Acid |
| | Ascorbate |
| | Aspartate |
| | Gluconate |
| | Glycinate |
| | Methionate |
| | Picolinate |
| | Sulfate |
| | Yeast |

What is claimed is:

1. A composition comprising:
   (i) asphalt or an asphalt mix, and
   (ii) an amino acid metal chelate, wherein the amino acid metal chelate is selected from the group consisting of copper bis-glycinate and zinc bis-glycinate.

2. A method of reducing hydrogen sulfide emission from asphalt or from the preparation of asphalt, comprising the step of:
   (i) combining an amino acid metal chelate to as or asphalt mix, wherein the amino add metal chelate is selected from the group consisting of copper bis-glycinate and zinc bis-glycinate.

* * * * *